(No Model.) 2 Sheets—Sheet 1.
C. S. BRADLEY.
GENERATING AND UTILIZING ELECTRIC CURRENTS OF HIGH POTENTIAL.
No. 519,377. Patented May 8, 1894.
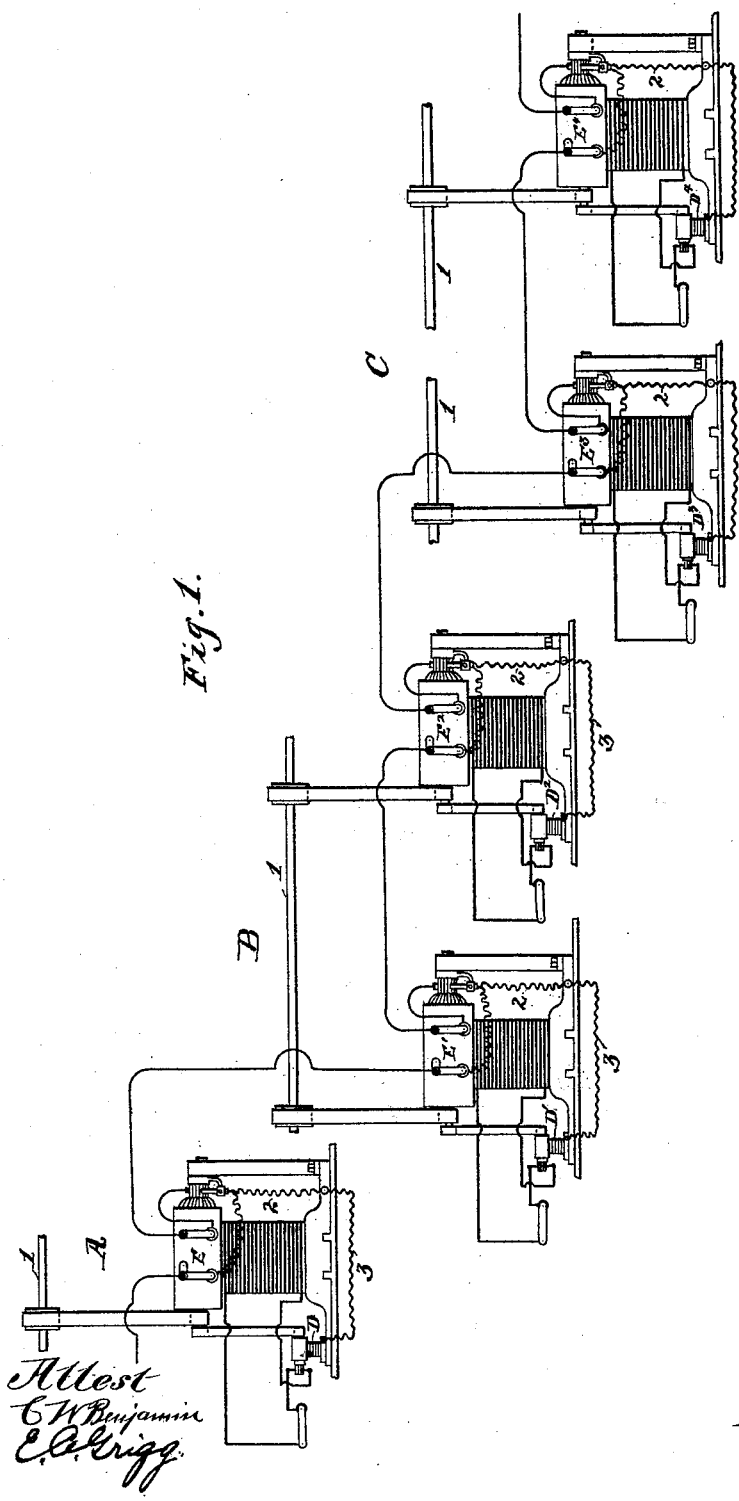

(No Model.) 2 Sheets—Sheet 2.
C. S. BRADLEY.
GENERATING AND UTILIZING ELECTRIC CURRENTS OF HIGH POTENTIAL.
No. 519,377. Patented May 8, 1894.
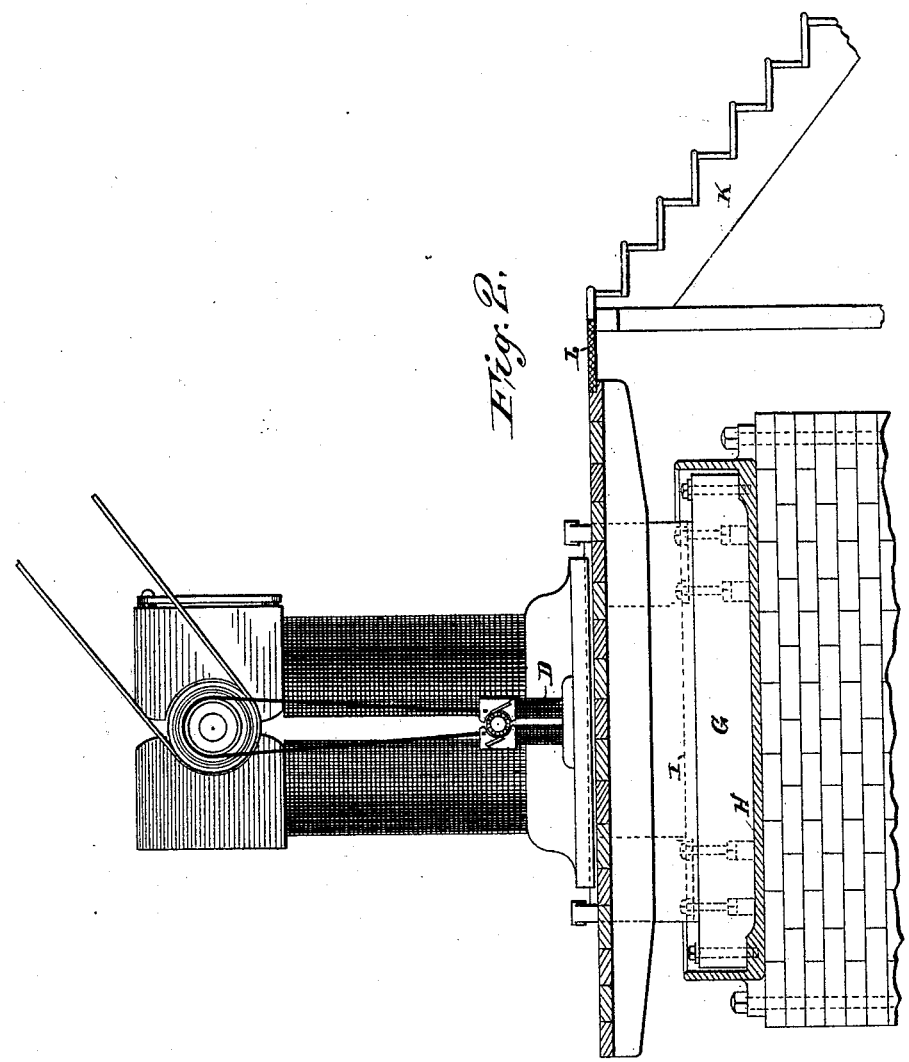

UNITED STATES PATENT OFFICE.

CHARLES S. BRADLEY, OF AVON, NEW YORK.

GENERATING AND UTILIZING ELECTRIC CURRENTS OF HIGH POTENTIAL.

SPECIFICATION forming part of Letters Patent No. 519,377, dated May 8, 1894.

Application filed November 10, 1892. Serial No. 451,502. (No model.)

*To all whom it may concern:*

Be it known that I, CHARLES S. BRADLEY, a citizen of the United States, residing at Avon, in the county of Livingston and State of New York, have invented certain new and useful Improvements in Generating and Utilizing Electric Currents of High Potential; and I do hereby declare the following to be a full, clear, and exact description of the invention, such as will enable others skilled in the art to which it appertains to make and use the same.

This invention relates to the generation of direct currents of high tension, with a view to utilizing such currents for the transmission of energy over long distances. The application of direct current has been heretofore limited to short distances, for the reason that the potential necessary to overcome the resistance of long lines is destructive to commutators and the insulation of their conductors.

In a prior application, Serial No. 427,587, filed by me April 4, 1892, I described a system for the generation of high potential currents in which a multiplicity of generators were coupled in series relation, each being highly insulated from earth and having its frame electrically connected with its windings. The invention therein described related more particularly to a multiplicity of generators located at the same station and driven by the same shaft, although some of the features therein recited were applicable to other modes of operating generators.

One feature of the present invention is intended to utilize the power at two or more stations distant from one another, the machines at the several stations being electrically coupled together so as to develop a current of the desired potential.

Another feature of the invention is a mode of mounting a generator so as to give it a high insulation with respect to earth.

In carrying out the invention I place a number of generators at two or more points where power may be available, as, for example, at two or more waterfalls, and provide for each generator or at each station an exciter for maintaining the field-magnetism.

The several features of novelty will be more particularly hereinafter described and definitely indicated in the appended claims.

In the accompanying drawings which illustrate the invention, Figure 1 is a diagram illustrating a series of three stations at which are placed independently operated generators having independent exciting machines for preserving their field-magnetism. Fig. 2 is an elevation partly in section of a generator and its exciter mounted in oil so as to give it a high insulation from earth.

Referring first to Fig. 1, A, B and C, are three stations, at which may be placed any desired number of dynamo electric machines consistent with the power available. The armatures of these machines are belted to the driving shaft 1 and a small generator D, D', &c., is belted to the armature shaft and delivers a current of sufficient tension to excite the field-magnets of the generators A, B, C. The generators may be of any suitable direct current type. Each machine and its exciter are highly insulated from earth and one of the brushes of the larger generator is connected with its frame by conductors indicated at 2, and also with the frame of the exciter. The connection with the exciter may be made by mounting both machines on the same bed-plate; as shown diagrammatically in Fig. 1, however, a wire connection 3 is made. The several machines at A, B, C, are connected in series relation, the connections being made at a highly insulated switch, which may be advantageously mounted on the insulated platform or on the machine, as indicated at E, E', E². The machines at each station are preferably mounted as indicated in Fig 2. The base of the machine is supported upon kiln-dried timbers G supported in an iron tank H filled with oil, the oil line being indicated at I. The tank is firmly mounted upon a suitable support of masonry as indicated. The machine is preferably mounted so that in gaining access thereto an attendant will have to mount a set of steps indicated at K, and a highly insulated platform L of glass is placed between the flooring around the machine and the stairs by which access is gained thereto. One of the brushes of the large generator is electrically connected with its frame by a substantial connection and the exciter is mounted upon the same bed-plate so that both the frames of the generator and exciter are at the same potential and are at a potential which is the same as that of the brush with which they are connected. Thus an attendant in standing upon the platform to regulate the machine or shift the connections, even should he be brought in contact with any metallic part of the apparatus, can receive no shock, being thoroughly insulated from earth and his body being at the same potential as the machine, and if by chance he should form a contact at the same time with the frame and either of the brushes, he could at most only receive the electro-motive-force of one particular machine, which will be fixed at such a limit as will not be dangerous to human life. Thus he can handle any part of the apparatus at any of the stations A, B, C, with entire safety from shock. When the power is sufficient a number of generators may be placed at any station and operated by the same driving shaft or independent shafts. If all are mounted on the same insulated platform care should be taken that the several machines be so placed as to prevent the attendant by any possibility making contact with two machines at the same time, as described in my former application above referred to. The several machines at any station may however be mounted on independent bases such as shown in Fig. 2.

It is evident that a series of motors may be operated at a considerable distance by a current generated as herein described. The motors may be connected in series and placed on insulating foundations such as shown in Fig. 2. The drop of potential between the brushes of any motor will be dependent upon the number of motors, as explained in my prior application. By exciting the field-magnets by an auxiliary machine as herein described any tendency of the machines to reverse while the system is in operation is counteracted; for if self excited unless provisions were adopted to prevent such a result the machine if series wound would, when power is cut off or declines, act as a motor, tend to reverse its direction of rotation, and if shunt wound an accidental stoppage of the machine while the system is in operation would tend to reverse the polarity of the field-magnets so that when again driven by its power shaft the machine would not act as a generator. A nice balancing of the series and shunt windings, such as referred to in my prior application above mentioned, might be adopted to avoid these difficulties; I prefer, however, to charge the field-magnets by a separate exciter or exciters at each station.

While a highly insulated foundation or support for a generator or motor is of special service in the system herein described, it might also be applied to alternating current machines where the potential is such as to render high insulation desirable.

Having thus described my invention, what I claim as new, and desire to secure by Letters Patent, is—

1. In a system for generating direct current of high potential a multiplicity of generators located at a series of stations distant from one another, each generator being highly insulated from earth and having a local generator for exciting its field-magnet circuit, the frames of both the generator and its exciter being electrically connected with a brush of the former so as to bring them to the potential of said brush.

2. In a system for generating direct current of high potential a multiplicity of generators located at a series of stations distant from one another, each generator being highly insulated from earth and having a local generator for exciting its field-magnet circuit, the frames of both the generator and its exciter being electrically connected with a brush of the former so as to bring them to the potential of said brush, the generators at the several stations being provided with one or more platforms highly insulated from earth, upon which an attendant must mount to gain access to the machine.

3. In a system for generating direct current of high potential a multiplicity of generators connected in series relation, each generator being highly insulated from earth, and having a highly insulated local generator for exciting its field-magnet circuit, the frame of each generator being electrically connected with one of its brushes, and a highly insulated platform upon which an attendant must stand to gain access to any generator.

4. In a system for generating or utilizing direct current of high potential a series of generators or motors having their supports surrounded by oil, thereby highly insulating them from earth, and provided with a highly insulated platform or platforms upon which an attendant must mount to gain access to the machine.

5. An electric generator or motor mounted upon supports insulated in oil and provided with an insulated platform upon which an attendant must mount to gain access to the machine.

In testimony whereof I affix my signature in presence of two witnesses.

CHARLES S. BRADLEY.

Witnesses:
STEPHEN L. COLES,
JOSEPH C. SPAETH.